Figure 1:
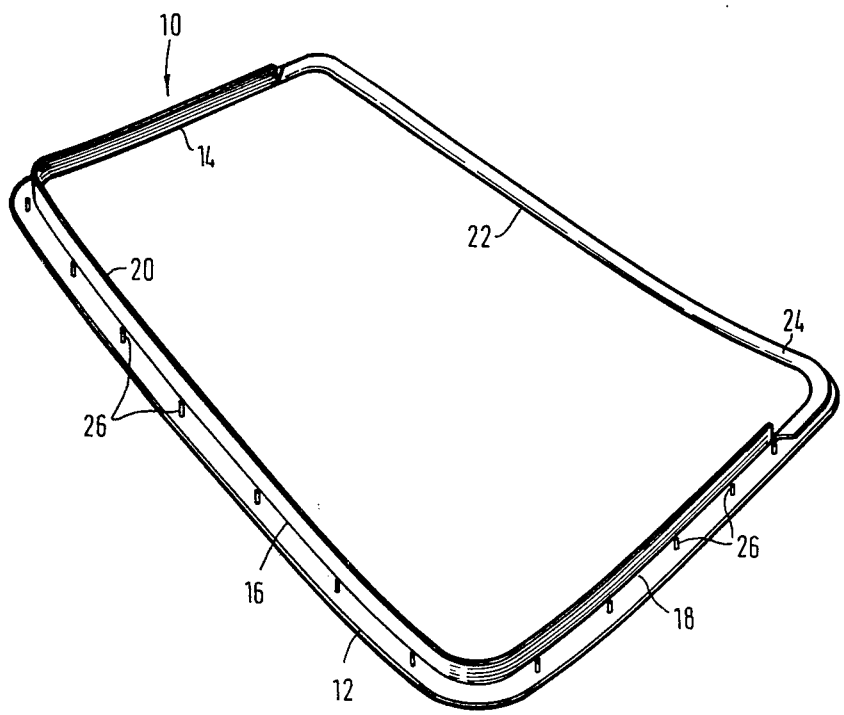

United States Patent [19]
Holt

[11] 4,251,104
[45] Feb. 17, 1981

[54] MOUNTING RING FOR SUNSHINE ROOF ASSEMBLY

[75] Inventor: Gordon J. Holt, Birmingham, England

[73] Assignee: Britax Weathershields Limited, Birmingham, England

[21] Appl. No.: 87,516

[22] Filed: Oct. 23, 1979

[30] Foreign Application Priority Data

Feb. 19, 1979 [GB] United Kingdom ............... 5709/79

[51] Int. Cl.³ .............................................. B60J 7/00
[52] U.S. Cl. ................................... 296/216; 296/218; 296/222; 29/401.1; 52/213
[58] Field of Search ............ 296/222, 216, 218; 52/213, 656; 29/401.1, 155 R

[56] References Cited

U.S. PATENT DOCUMENTS

| | | | |
|---|---|---|---|
| 2,410,332 | 10/1946 | Ball | 296/222 |
| 4,084,848 | 4/1978 | Cunningham | 296/222 |
| 4,127,302 | 11/1978 | Green | 296/218 |

*Primary Examiner*—Robert R. Song
*Attorney, Agent, or Firm*—Young & Thompson

[57] ABSTRACT

In order to mount a sunshine roof assembly in the roof of a vehicle a mounting ring 10 is fitted in an aperture in the vehicle roof. The mounting ring has a downwardly extending flange 20 on three of its sides which project through the aperture in the vehicle roof. The fourth side 22 is of U-shaped cross-section so as to embrace the corresponding edge of the aperture. The mounting ring is fitted into the aperture from above and secured to the vehicle roof. The sunshine roof assembly is then fitted from below and secured to the downwardly extending flange 20 on three of the sides of the aperture.

6 Claims, 4 Drawing Figures

MOUNTING RING FOR SUNSHINE ROOF ASSEMBLY

This invention relates to a mounting ring to facilitate the installation of a so-called "sunshine roof" assembly which can be fitted, as a unit, into an opening in the roof of a vehicle. The invention is advantageously employed with regard to the installation of a sliding roof assembly as described in U.S. Pat. No. 4,084,848. However, it may also be employed with other sunshine roof assemblies.

A sliding roof assembly of the type described in U.S. Pat. No. 4,084,848 saves time and expense in the installation of a sunshine roof in a vehicle. For example, it is only necessary to cut an aperture in the vehicle roof and make holes for receiving rivets, and then to drop in the roof assembly, as a unit which is secured by the rivets. Thus, the latter technique can be used to modify an existing vehicle. However, problems arise when using an assembly in accordance with U.S. Pat. No. 4,084,848. That assembly comprises a single piece pressing in the shape of a rectangular frame which rests on the periphery of the opening in the vehicle roof. In the preferred embodiment, the frame has a generally S-shaped cross-section, the upper part of the S-shape forming a flange which projects above the upper surface of the vehicle roof and supports a static closure panel under which the sliding panel is disposed when the roof is open. This is less attractive from the point of view of design and hence there is a problem of providing a more flush installation in an assembly of this type.

In another way of installing a sunshine roof in a vehicle roof, the roof assembly is fitted below the roof from inside the car. The sliding panel then slides under the existing vehicle roof. However, it is necessary to profile the aperture in the vehicle roof to provide a downwardly extending flange and time-consuming work is involved both in forming this flange and aperture in the roof panel of the vehicle, in touching up the paintwork (which may be damaged in the region of the upper flange when a vinyl roof topping is not fitted).

The invention offers a solution to both of these problems by providing a mounting ring for installing a sunshine roof assembly in an opening in the roof of a vehicle characterised in that it comprises a substantially rectangular frame, each side of which has a laterally extending first flange and a second flange attached to the inner edge of the first flange, the second flange on three of the sides extending substantially perpendicular to the first flange, so that such sides have an L-shaped cross-section, and the second flange on the fourth side being folded back substantially parallel to the first flange, so that the fourth side has a U-shaped cross-section.

In a preferred embodiment of the invention, a number of fixing studs are also provided along the first flange of each of said three sides, which studs project downwardly in the direction of the adjacent second flange.

The trim mounting ring is preferably fitted to an aperture in a vehicle roof by a method comprising the steps of locating the rear edge of the aperture within the recess of the U-shaped cross section of the fourth side of the mounting ring of the first type bringing the first flange of the mounting ring into abutment with the top of the vehicle roof so that the second flange on said three sides projects downwardly through the aperture, securing said three sides to the adjacent edges of the roof, and attaching the drain tray to the second flange on said three sides of the ring.

Figure 2:
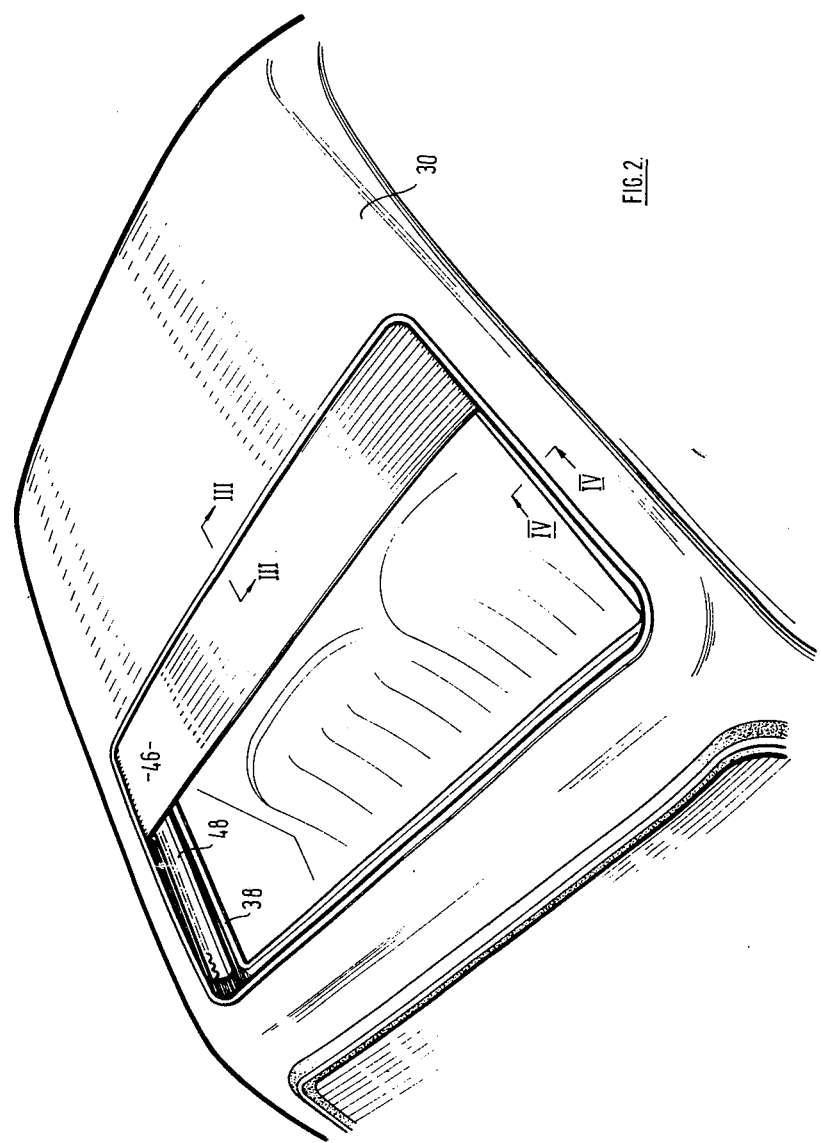
Figure 3:
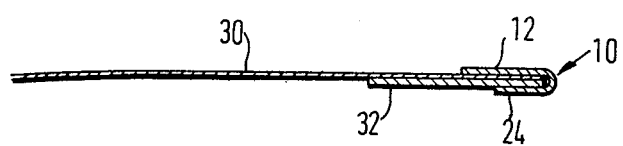
Figure 4:
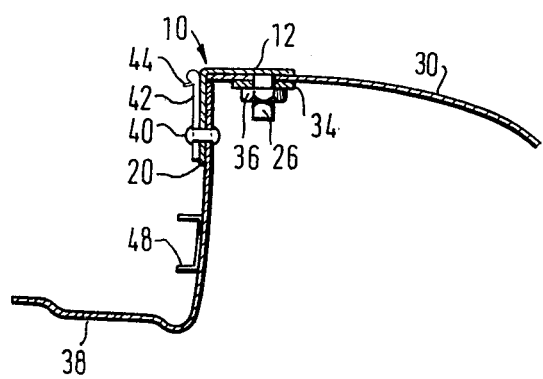

An embodiment of the invention will now be described, by way of example, with reference to the accompanying drawings, in which:

FIG. 1 is a perspective view from below of a mounting ring in accordance with the invention, FIG. 2 is a perspective view of a car roof fitted with a sunshine roof with the mounting ring shown in FIG. 1, FIG. 3 is a cross-section on the line III—III in FIG. 2, and FIG. 4 is a cross-section on the line IV—IV in FIG. 2.

Referring to FIG. 1, a mounting ring 10 is in the form of a substantially rectangular frame, on each side of which is a laterally extending flange 12. Three sides 14,16 and 18 have a second flange 20 extending perpendicular to the flange 12 from its inner edge so as to form an L-shaped cross-section. On the fourth side 22, a second flange 24, also attached to the inner edge of the first flange 12, is turned back so as to form a U-shaped cross-section. Fixing studs 26 project from the flange 12, parallel to the flange 20, on the sides 14,16 and 18 of the frame.

Referring now to FIG. 2, a rectangular aperture is made in a vehicle roof 30 so as to provide an easy clearance for receiving the second flange 20 on the sides 14,16 and 18 of the ring 10. With the aid of a template, fixing holes are formed in the vehicle roof along the edge at the front and sides of the vehicle, the holes being spaced so that each corresponds with a respective stud 26. A stiffening strip 32 (FIG. 3) is located beneath the rear edge of the rectangular aperture and the ring 10 is then fitted from above by inserting the rear edge of the aperture, together with the stiffening strip 32, into the recess of the U-shaped cross-section of the fourth side 22 of the ring. The rest of the mounting ring is then lowered so that the flange 12 rests on the upper surface of the vehicle roof 30, with the studs 26, projecting through the above-mentioned holes therein.

A respective fixing strip 34, having stud-receiving holes, is then located under the roof along each of the sides of the aperture corresponding to the sides 14,16 and 18 of the mounting ring and is secured by means of a nut 36 on each stud. The mounting ring 10 is thus firmly secured to the vehicle roof so as to provide the aperture therein with a downwardly extending flange 20 on its front and lateral edges. A single-piece pressing, forming the lower part or drain of a unitary sliding roof assembly is then fitted from below and secured to the flange 20 by rivets 40 which also pass through a resilient seal member 42. The seal member 42, has a lip 44, for sliding abutment with a sliding panel 46, (FIG. 2) of the assembly. The panel 46 is mounted on tracks 48 by means of sliders (not shown).

The mounting ring 10 has the following advantages:

(1) No difficult and time consuming work is required in profiling the aperture of the vehicle roof as may be required with the type of roof assembly employed. More particularly, the dimensions of the roof aperture may be such as to provide an easy clearance for the turned down flanges of the ring 10 and the cut edges of the roof do not need to be finished off hence saving time in installation. The manufacturing tolerances of the ring 10 especially of the frame opening, are controlled with regard to the manufacturing tolerances of the unitary roof assembly so as to provide a good fit on installation.

Thus, the manufacturing or installation tolerances are not so important with regard to making an aperture in the vehicle roof to receive the assembly.

(2) When a vinyl roof topping is not fitted, no paint touching in is required because the area of possible damage lies beneath the upper laterally extending flange 12 of the ring 10.

(3) The installation time is considerably reduced.

(4) Since the cost of the ring 10 is a relatively small part of the total cost of the sliding roof assembly, it is economic to stock a range of trim rings to fit different roof curvatures thereby reducing the work involved in matching the assembly to the roof contour.

I claim:

1. A mounting ring for installing a sunshine roof assembly in an opening in the roof of a vehicle comprising a substantially rectangular frame, each side of which has a laterally extending first flange and a second flange attached to the inner edge of the first flange, the second flange on three of the sides extending substantially perpendicular to the first flange, so that such sides have an L-shaped cross-section, and the second flange on the fourth side being folded back substantially parallel to the first flange, so that the fourth side has a U-shaped cross-section.

2. A mounting ring according to claim 1, further comprising attached to the first flange on each of said three sides securing means for securing the frame to a vehicle roof.

3. A mounting ring according to claim 2, wherein the securing means comprises studs projecting parallel to the adjacent second flange.

4. A method of installing, in a vehicle roof, a sunshine roof assembly comprising an openable panel mounted in a frame which includes a drain tray, the method comprising cutting a substantially rectangular aperture, providing a mounting ring comprising a substantially rectangular frame, each side of which has a laterally extending first flange and a second flange attached to the inner edge of the first flange, the second flange on three of the sides extending substantially perpendicular to the first flange, so that such sides have an L-shaped cross-section, and the second flange on the fourth side being folded back substantially parallel to the first flange, so that the fourth side has a U-shaped cross-section.

5. A method according to claim 4, wherein the said three sides are secured to the vehicle roof by studs attached to the first flange and projecting through holes, in the vehicle roof adjacent to the corresponding three edges of the aperture, said holes being formed prior to fitting the ring.

6. A method according to claim 4, further comprising locating a stiffening strip along the rear edge of the aperture, such stiffening strip, together with the rear edge, being received within the recess of the U-shaped cross-section of the fourth side of the ring.

* * * * *